May 7, 1935.  T. F. MANDAHL  2,000,490
SLIT FILTER
Filed March 1, 1933
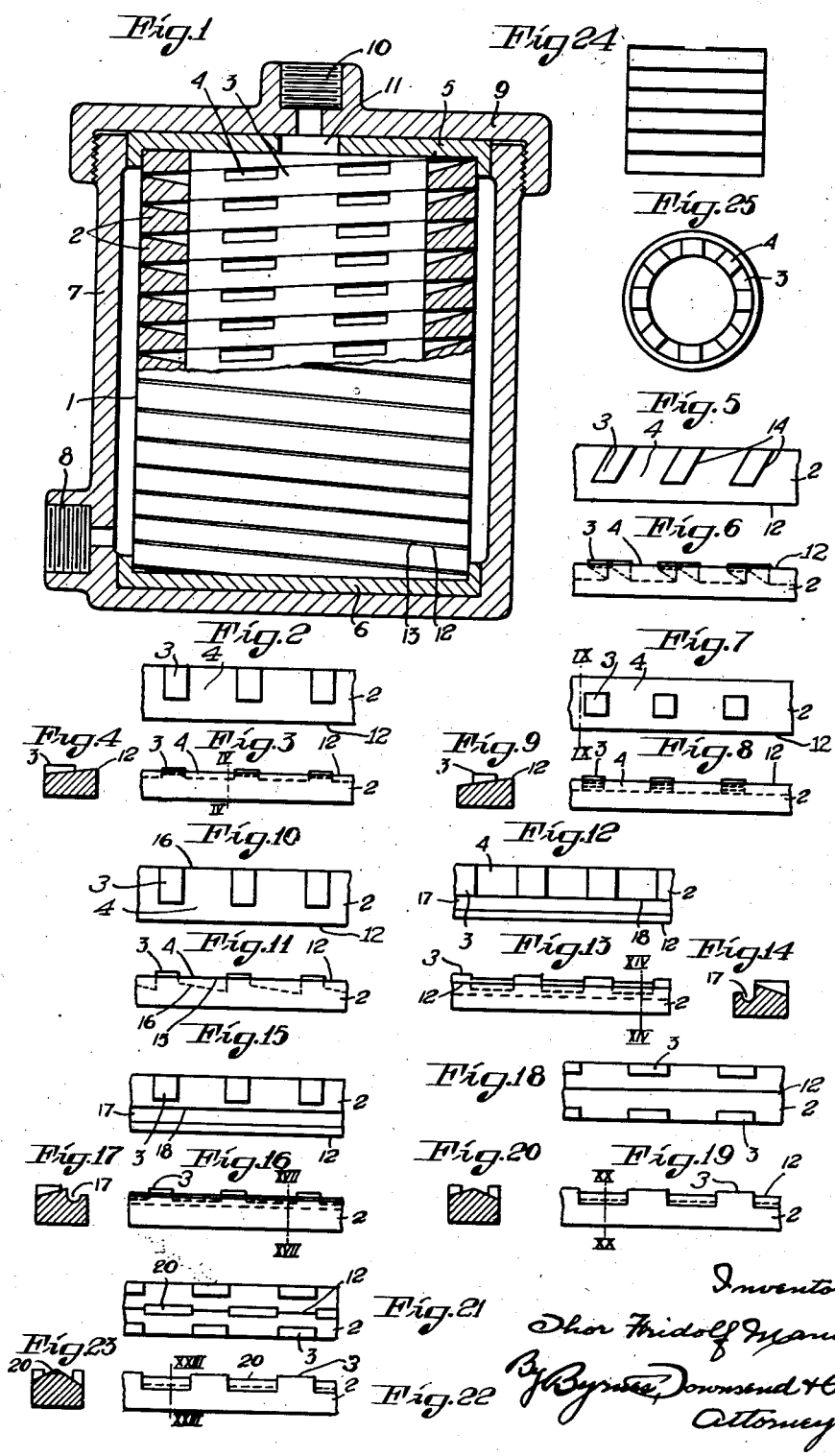

Patented May 7, 1935

2,000,490

UNITED STATES PATENT OFFICE 2,000,490

SLIT FILTER

Thor Fridolf Mandahl, Stockholm, Sweden, assignor to Svenska Ackumulator Aktiebolaget Jungner, Stockholm, Sweden, a corporation of Sweden Application March 1, 1933, Serial No. 659,220
In Sweden March 7, 1932

6 Claims. (Cl. 210—169)

The present invention refers to slit filters, that is to say to filters consisting of wire- or ribbon-shaped elements which are constructed and arranged in such a manner that slits or clearances are produced between adjacent elements or adjacent parts of the same element, through which slits the medium to be filtered is caused to pass. The wire or ribbon may be wound spirally or helically, or, a plurality of wires or ribbons may be superimposed on each other.

In such filters it is previously known to have the wire profiled in such a manner that a slit or clearance of the desired size is obtained between the wires or wire parts. To this end the wire is provided with abutments or other elevations which are so arranged, extending for instance over the whole width of the wire, that the filter edge of the wire limiting the filtering slit will be interrupted by the elevations, thus causing a corresponding reduction of the operative length of the filtering slit.

The invention relates to an arrangement in filters of the above-mentioned type whereby the length of the filtering slit and thus the operating capacity of the filter is increased. This is brought about, according to the invention, by the feature that the wire or ribbon is provided with a filter edge uninterrupted by the elevations and limiting the filtering slit.

This uninterrupted filter edge may be arranged in various ways. The elevations on the wire or ribbon may be so arranged that a surface is produced which is free from elevations and extends in the longitudinal direction of the wire or ribbon, on which surface or in the edge of which the filter edge is located. The filter edge may be parallel to the side edges of the wire or ribbon and may be situated in or in the proximity of the one of these edges. The elevations, or loose distance pieces, may extend, for instance, from the one side edge for a suitable distance inwardly on the wire or ribbon, without however reaching as far as to the other side edge, which latter may then be arranged as a filter edge, or, the elevations may be arranged between the two side edges of the wire or ribbon, which edges will both be uninterrupted in the latter case.

The invention will be described more closely with reference to the forms of embodiment thereof disclosed in the accompanying drawing, other features characteristic of the invention being then also set forth.

In the drawing, Fig. 1 shows a longitudinal section of a filter provided with a filter body constructed in accordance with the invention, said filter body being illustrated partly in section. Figs. 2–23 show various embodiments of a wire made according to the invention for the production of filter bodies. Figs. 2, 3 and 4 show a first embodiment in plan view, elevation and section respectively on line IV—IV in Fig. 3. Figs. 5 and 6 show a second embodiment in plan view and in elevation respectively. Figs. 7, 8 and 9 show a third embodiment in plan view, in elevation and in section on line IX—IX in Fig. 8 respectively. Figs. 10 and 11 show a fourth embodiment in plan view and in elevation respectively. Figs. 12, 13 and 14 show a fifth embodiment in plan view, in elevation and in section on line XIV—XIV in Fig. 13 respectively. Figs. 15, 16 and 17 show a sixth embodiment in plan view, in elevation and in section on line XVII—XVII in Fig. 16 respectively. Figs. 18, 19 and 20 show a seventh embodiment in plan view, in elevation and in section on line XX—XX in Fig. 18 respectively. Figs. 21, 22 and 23 show an eighth embodiment in plan view, in elevation and in section on line XXIII—XXIII in Fig. 22 respectively. Fig. 24 shows an elevation of a filter body according to the invention consisting of superimposed rings of wire or ribbon material, and Fig. 25 is a plan view of such a ring.

According to Fig. 1, the filter body 1 consists of a helically wound structure of a wire or ribbon 2 which is provided on its upper side with elevations in the form of abutments 3 or the like and with recessed portions or incisions 4 located between said elevations, while the lower side of the wire may be plane. An upper and a lower plate 5 and 6 respectively may be secured, for instance soldered, to the helix 1. The wire spiral 1 and the appertaining plates 5 and 6 are arranged within a casing 7 which is closed by a cover 9 keeping the wire spiral 1 compressed with the abutments 3 on the upper side of the wire 2 in one turn bearing tightly against the lower side of the wire in the adjacent upper turn, the incisions 4 then forming openings or passages between the turns of the wire. The casing 7 is provided with an inlet opening 8 and the cover 9 with an outlet opening 10, which latter is in communication with the interior of the wire spiral 1 through an opening 11 provided in the upper plate 5.

Figs. 2, 3 and 4 show more clearly the appearance of the wire forming the filter body in Fig. 1. As will be seen from these figures, the abutments 3 arranged on the upper side of the wire 2, which is bevelled-off in a direction toward the one side edge, extend from this side edge only over a portion of the width of the wire 2, thus without reaching to the other side edge, so that an uninterrupted continuous filter edge 12 is obtained along the whole length of the wire. In spiral-shaped slit filters according to Fig. 1 there will thus be obtained between the filter edge 12 and the lower side of the superimposed wires, a helically extending uninterrupted slit 13 (see Fig. 1) with outlets formed by the incisions 4, said outlets being flared on the lines of wedges in a direction toward the interior of the filter body, that is to say outwardly toward the outlet in the filtering direction.

In all embodiments to be described in the following, the wire 2 is provided, according to the invention, with a filter edge 12 uninterrupted by the abutments 3. The lower face of the ribbon or wire 2 is flat in each instance, thus providing an uninterrupted filter slit between the uninterrupted filter edge 12 of one ribbon and the flat surface of an adjacent ribbon, or adjacent turn of the same ribbon in the case of a spirally wound ribbon.

In the embodiments shown in Figs. 5 and 6, the parallel side edges 14 of the abutments 3 form an acute angle to the longitudinal axis of the wire. Thus the medium which is being filtered will, when leaving the filtering slit, attain an outlet direction deviating from the inlet direction, whereby a deposit of silt particles on the outer sides of the abutments is prevented.

In the embodiment according to Figs. 7, 8 and 9, the abutments 3 are arranged in a row between the side edges of the wire, substantially in the middle of the upper side of the wire 2, whereby the outer edge of the wire opposed to the filter edge 12 also becomes free and uninterrupted.

In the embodiment shown in Figs. 10 and 11, the openings or incisions 4 located between the abutments 3 are wedge-shaped not only crosswise of the wire, as in the previous embodiments, but also longitudinally of the wire, in that the side edges of the incisions 4 form different angles to the longitudinal axis of the wire. The one side edge 12 may extend, for instance, substantially parallel to the longitudinal axis of the wire, while the other side edge 16 forms an angle to said axis, which angle is equal, for instance, to the angle of inclination of the wire if it is spirally wound. Hereby the medium which is being filtered will attain an outlet direction deviating from the inlet direction.

In the embodiment shown in Figs. 12, 13 and 14 there is provided a longitudinally extending channel-like recess 17 between the continuously extending filter edge 12 and the surface of the wire occupied by the abutments 3. By this arrangement there will be had, in addition to the continuously extending filter edge 12, which effects a coarse filtering of the medium subjected to filtering, a further filter edge 18 at the transition between the channel 17 and the abutments 3 or the outwardly wedge-shaped incisions or openings 4 respectively. This filter edge 18, which in the embodiment shown is interrupted by the abutments, brings about a fine-filtration of the medium, the channel 17 then serving to collect and to remove the particles that cannot pass the fine-filter edge 18.

In the embodiment shown in Figs. 15, 16 and 17 there is also provided a longitudinally extending channel 17 affording a second filter edge 18, but here this filter edge is uninterrupted, as is also the filter edge 12, in that the abutments 3 do not extend up to the same.

In the embodiment shown in Figs. 18, 19 and 20 there are two rows of abutments 3, the filter edge 12 being situated between these rows of abutments.

Figs. 21, 22 and 23 show a further embodiment with two rows of abutments 3. Here, the filter edge 12 extends up to the level of the plane of the abutments 3, but is provided with reductions 20 to form filter openings.

Instead of making the filter body in the form of a spirally wound wire or ribbon, as shown in Fig. 1, the same may, as will appear from Fig. 24, consist of a plurality of frames superimposed on each other, such as rings of a wire or ribbon according to the invention with abutments 3 and a continuously extending filter edge 12 uninterrupted by the abutments, as will be seen from Fig. 25.

The invention is applicable to all kinds of slit filters consisting of wire, rods or ribbons, independently of the mode of arrangement of the wires or wire parts relatively to each other. The invention is not limited to slit filters in which the wire or ribbon is provided with special means to increase the permeability in the filtering direction, even if such means may be advantageously combined with the uninterrupted filter edge according to the invention.

What I claim is:—

1. A filter unit comprising ribbons having adjacent faces in contact, each ribbon having one flat face and transverse contact ridges at its opposite face for engagement with the substantially flat surface of the adjacent ribbon, whereby a plurality of transverse filter passageways are formed between the ribbons by the respective adjacent pairs of ridges, each passageway having a cross-sectional area increasing in the filtering direction, said transverse ridges terminating short of the inlet edges of said ribbons to provide between adjacent ribbons a filtering slit uninterrupted by said ridges and extending continuously along the inlet sides of said ribbons.

2. A filter unit comprising superimposed ribbons and transverse spacing pieces between adjacent surfaces of said ribbons and cooperating therewith to form a plurality of filter passageways between adjacent pairs of spacing pieces, each passageway having a cross-sectional area increasing in the filtering direction, said spacing pieces extending only partly over the width of the ribbons to provide a filtering slit uninterrupted by said spacing pieces and extending continuously along the inlet side of the ribbons.

3. A filter unit comprising superimposed ribbons and transverse contact ridges between adjacent ribbons, whereby a plurality of transverse filter passageways are formed between the ribbons by the respective adjacent pairs of ridges, each passageway having a greater cross-sectional area at one end thereof than at its other end, said transverse ridges extending from that edge of said ribbons at which the passageways are of greater cross-sectional area towards and terminating short of the opposite edge thereof, thereby to provide between adjacent ribbons a filtering slit which extends continuously along the said opposite edges.

4. A filter unit comprising superimposed ribbons and transverse contact ridges between adjacent ribbons, whereby a plurality of filter passageways are formed between said ribbons by the respective adjacent pairs of ridges, said ridges terminating short of the inlet edges of the ribbons, and a channel-like recess extending longitudinally of one ribbon between the inlet edge thereof and the said ridges which space said ribbon from an adjacent ribbon, the opening into said recess being continuous along the inlet edges of adjacent ribbons and of greater depth than the openings from said recess into said passageways.

5. A filter unit comprising ribbons having adjacent faces in contact, each ribbon having transverse contact ridges at its one side engaging a substantially flat surface of the adjacent ribbon, whereby a plurality of filter passageways are formed between the ribbons by the respective adjacent pairs of ridges, each passageway having a greater cross-sectional area at one end thereof than at its other end, said transverse ridges extending only partly over the width of the ribbon to provide between adjacent ribbons a filtering slit uninterrupted by said ridges and extending along the whole length of the said adjacent ribbons, and a longitudinal channel-like recess in proximity to that edge of each ribbon which is outside said transverse ridges.

6. A filter unit comprising ribbons having adjacent faces in contact, each ribbon having transverse contact ridges at its one side engaging a substantially flat surface of the adjacent ribbon, whereby a plurality of filter passageways are formed between the ribbons by the respective adjacent pairs of ridges, each passageway having a greater cross-sectional area at one end thereof than at its other end, said transverse ridges extending only partly over the width of the ribbon, so that a filtering slit uninterrupted by said ridges will be provided along at least one edge between adjacent ribbons along the whole length of the adjacent ribbons, a longitudinal channel-like recess being provided in proximity to the one edge of each ribbon outside said transverse ridges, said ridges extending from the one edge of the ribbon and terminating at a distance from the inner edge of said longitudinal recess.

THOR FRIDOLF MANDAHL.